No. 640,105. Patented Dec. 26, 1899.
E. E. CROWELL.
BRAKE BEAM HOLDER.
(Application filed May 25, 1899.)
(No Model.)
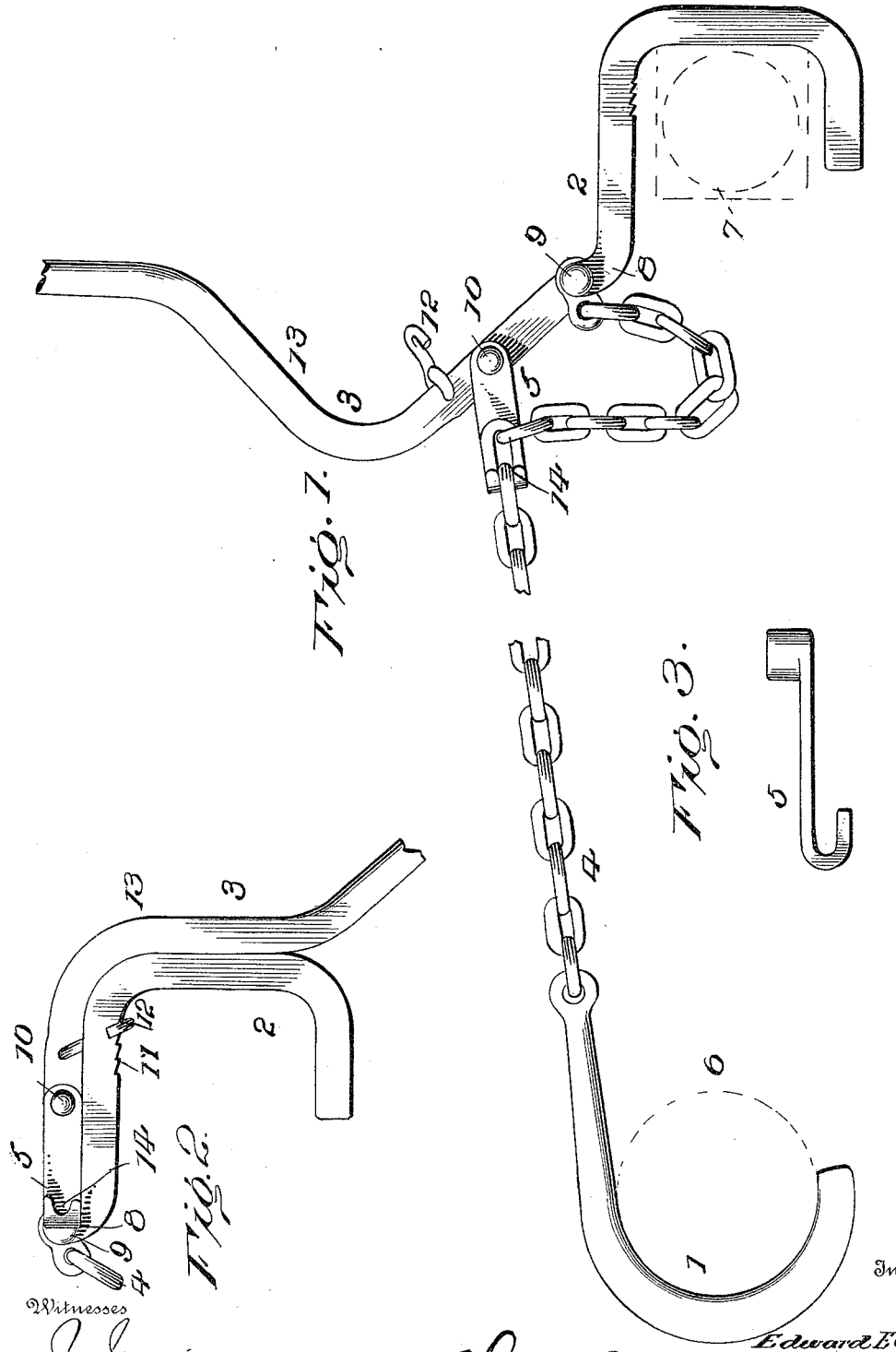

United States Patent Office.

EDWARD E. CROWELL, OF WATERVILLE, MAINE.

BRAKE-BEAM HOLDER.

SPECIFICATION forming part of Letters Patent No. 640,105, dated December 26, 1899.

Application filed May 25, 1899. Serial No. 718,252. (No model.)

*To all whom it may concern:*

Be it known that I, EDWARD E. CROWELL, a citizen of the United States, residing at Waterville, in the county of Kennebec and State of Maine, have invented certain new and useful Improvements in Brake-Beam Holders; and I do hereby declare the following to be a full, clear, and exact description of the invention, such as will enable others skilled in the art to which it appertains to make and use the same.

This invention has for its object to provide simple, effective, and easily-operated means for use in connection with brake mechanism of railway-cars to hold the brake-beam in proper position when replacing brake-shoes, making connection with the operating-rod, adjusting the connections and parts to allow for wear, and for other purposes requiring the brake-beam to be held against the tension of the springs.

The improvement consists of the novel features and details of construction, which hereinafter will be more fully set forth, illustrated, and finally claimed.

Within the purview of the invention it is to be understood that various changes in the form, proportion, and minor details of construction may be resorted to without departing from the spirit or sacrificing any of the advantages thereof.

In the drawings, Figure 1 is a detail view in elevation showing the application of the invention, the dotted lines representing the axle and a brake-beam of a railway-car. Fig. 2 is a detail view showing the relation of the parts after the lever has been operated to advance the engaging hooks, one of the latter being omitted. Fig. 3 is a detail view of the grab-hook for making adjustable connection with the links of the connecting-chain.

Corresponding and like parts are referred to in the following description and indicated in all the views of the drawings by the same reference characters.

In its organization the device comprises hooks 1 and 2, an operating-lever 3, pivoted to the shank of the hook 2, a connecting-chain 4, and a grab-hook 5, the latter having pivotal connection with the lever 3 a short distance from its fulcrum or pivotal connection with the hook 2.

The hook 1 is adapted to be engaged with the axle 6 of a railway-car or the like, and the hook 2 is designed to be applied to a brake-beam 7 of a brake apparatus of the said car. The terminal portion of the shank of the hook 2 is outwardly deflected, as shown at 8, and the pivot-fastening 9, connecting the lever 3 therewith, receives the terminal link of the chain 4. By having the end portion of the shank deflected outwardly or offset, as shown at 8, the pivoted end portion of the lever 3 is adapted to lie against the outer side of the shank, as shown in Fig. 2, thereby bringing the pivot-fastening 10 of the grab-hook 5 in line with the pivot-fastening 9 and obviating the tendency of the lever 3 to move either outward or inward.

The hook 2 is of approximately square formation, its closed end being straight and its bill and shank being likewise straight and parallel. The inner edge of the shank of the hook 2 is provided with a series of teeth 11 to be engaged by the free end of a hook 12, loosely connected with the lever 3 and serving to hold the latter against accidental displacement when the device is in active operation.

The operating-lever 3 is formed with an offset 13 near its pivotal end, the portions constituting the offset being right-angularly disposed and proportioned, so as to fit close against the outer sides of the shank and closed end of the hook 2, as indicated in Fig. 2. The grab-hook 5, pivoted to the lever 3, has its outer end notched or slotted, as shown at 14, to receive a link of the chain 4 and admitting of the link looped therewith being engaged with the hooked end of the part 5. Of the two adjacent links the one is disposed at right angles to the plane of the body portion of the hook 5 and enters the slot 14 and the other is in the plane of the part 5 and fits in the space formed between the shank and bill portions of the hook.

When it is required to secure the advantages of the device, the hook 1 is engaged with the axle 6 and the hook 2 with the brake-beam 7, the lever 3 occupying the position, substantially as shown in Fig. 1, and the link of the chain being engaged with the part 5. Upon moving the free end of the lever 3 toward the hook 2 the distance between the two hooks will be decreased and the brake-beam will be advanced toward the axle, as will be readily understood. When the offset portion of the lever engages with the shank and closed end portion of the hook 2, the part 12 is swung into engagement with one of the teeth 11, thereby securing the lever in the located position. The brake-beam will be held in fixed relation, thereby admitting of the required work to be performed with ease and despatch.

Having thus described the invention, what is claimed as new is—

1. In a brake-beam holder, axle and brake-beam engaging hooks, a chain connecting the hooks, a lever pivotally connected with one of the hooks, and a grab-hook applied to the lever a short distance from its fulcrum and adapted to engage with any one of the links of the chain to vary its effective length compared with the distance between the axle and brake-beam of various cars, substantially as described.

2. In a brake-beam holder, axle and brake-beam engaging hooks, a chain connecting the hooks, a lever pivotally connected with one of the hooks, means for securing the lever when operated to hold the brake-beam in the required position, and a grab-hook pivoted to the lever a distance from its fulcrum, substantially as described.

3. In a device of the character set forth, a hook having the inner portion of its shank toothed and having the terminal portion of the said shank outwardly deflected, an attaching device connected by chain with the hook, an operating-lever pivoted to the deflected terminal portion of the said hook, a fastening-hook having loose connection with the lever and adapted to engage with one of the teeth of the main hook, and a grab-hook applied to the operating-lever and adapted to engage with a link of the chain, substantially as set forth.

4. The herein-described device for the purpose set forth, comprising a pair of hooks for engagement with the axle and brake-beam respectively, the brake-beam hook having the terminal portion of its shank outwardly deflected and its inner edge toothed, a chain connecting the two hooks, an operating-lever having an offset portion to conform to the shank and closed end of the brake-beam hook and pivoted to the deflected portion of the latter, a grab-hook applied to the lever for engagement with a link of the chain, and a fastening-hook likewise applied to the operating-lever and adapted to engage with one of the teeth of the brake-beam hook, substantially as set forth.

In testimony whereof I affix my signature in presence of two witnesses.

EDWARD E. CROWELL. [L. S.]

Witnesses:
D. P. FOSTER,
B. F. CHOFFEE.